US009682636B2

(12) United States Patent
Yoshiura (10) Patent No.: US 9,682,636 B2
(45) Date of Patent: Jun. 20, 2017

(54) CONNECTION STRUCTURE BETWEEN METAL PLATES (71) Applicant: SMK Corporation, Tokyo (JP)

(72) Inventor: Yasuo Yoshiura, Kanagawa (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 14/840,048

(22) Filed: Aug. 31, 2015

(65) Prior Publication Data
US 2016/0248186 A1    Aug. 25, 2016

(30) Foreign Application Priority Data

Feb. 25, 2015  (JP) ................ 2015-034944

(51) Int. Cl.
| B60L 11/18 | (2006.01) |
| H01R 4/64 | (2006.01) |
| H01R 12/58 | (2011.01) |
| H01R 13/05 | (2006.01) |
| H01R 13/10 | (2006.01) |
| H01R 9/16 | (2006.01) |

(52) U.S. Cl.
CPC ....... B60L 11/1861 (2013.01); B60L 11/1816 (2013.01); H01R 4/64 (2013.01); H01R 12/58 (2013.01); H01R 13/052 (2013.01); H01R 13/10 (2013.01); H01R 9/16 (2013.01)

(58) Field of Classification Search
CPC ........ H01R 4/64; H01R 12/58; H01R 13/052; H01R 9/16

USPC ...................................... 439/65, 80–81, 751
See application file for complete search history.

(56) References Cited

U.S. PATENT DOCUMENTS

| 4,630,338 A * | 12/1986 | Osterland ............... F16B 5/123 24/293 |
| 5,191,513 A * | 3/1993 | Sugiura .................. H05K 7/142 174/138 D |
| 5,295,862 A * | 3/1994 | Mosquera ............ H01R 12/707 439/83 |
| 5,707,244 A * | 1/1998 | Austin ..................... H01R 4/64 439/95 |
| 5,833,480 A * | 11/1998 | Austin ..................... H01R 4/64 439/95 |
| 5,934,916 A * | 8/1999 | Latal ..................... H05K 7/142 439/95 |

(Continued)

FOREIGN PATENT DOCUMENTS

| JP | 2011-208599 A | 10/2011 |
| JP | 2015-011844 A | 1/2015 |

*Primary Examiner* — Felix O Figueroa (57) ABSTRACT

A connection structure between two metal plates for mutually positioning and electrically connecting the metal plates is provided by a simple press-in process without using an additional connection part. A curved blade plate curving with a curvature smaller than that of a cylindrical inner wall surface of an insertion hole in one of the metal plates in the same direction as that of the cylindrical inner wall is formed on the other metal plate. The curved blade plate is pressed into the insertion hole while being elastically deformed in the curving direction, so that edges along both side edges of a curved outer peripheral surface each make press contact with the cylindrical inner wall surface. The metal plates are thereby fixed and electrically connected to each other.

11 Claims, 10 Drawing Sheets

(56) References Cited

U.S. PATENT DOCUMENTS 6,071,131 A * 6/2000 Pliml, Jr. ................ H01R 4/64
                                                    439/95
6,827,536 B1 * 12/2004 Leon .................... F16B 5/0642
                                                    411/45

* cited by examiner

(RELATED ART)

CONNECTION STRUCTURE BETWEEN METAL PLATES

CROSS REFERENCE TO RELATED APPLICATION

The contents of the following Japanese patent application are incorporated herein by reference,
NO. 2015-034944 filed on Feb. 25, 2015.

FIELD

The present invention relates to a connection structure between metal plates for inserting a contact portion of a second metal plate into an insertion hole of a first metal plate to relatively position the first metal plate and the second metal plate and electrically connect the first metal plate and the second metal plate.

BACKGROUND

Figure 11:
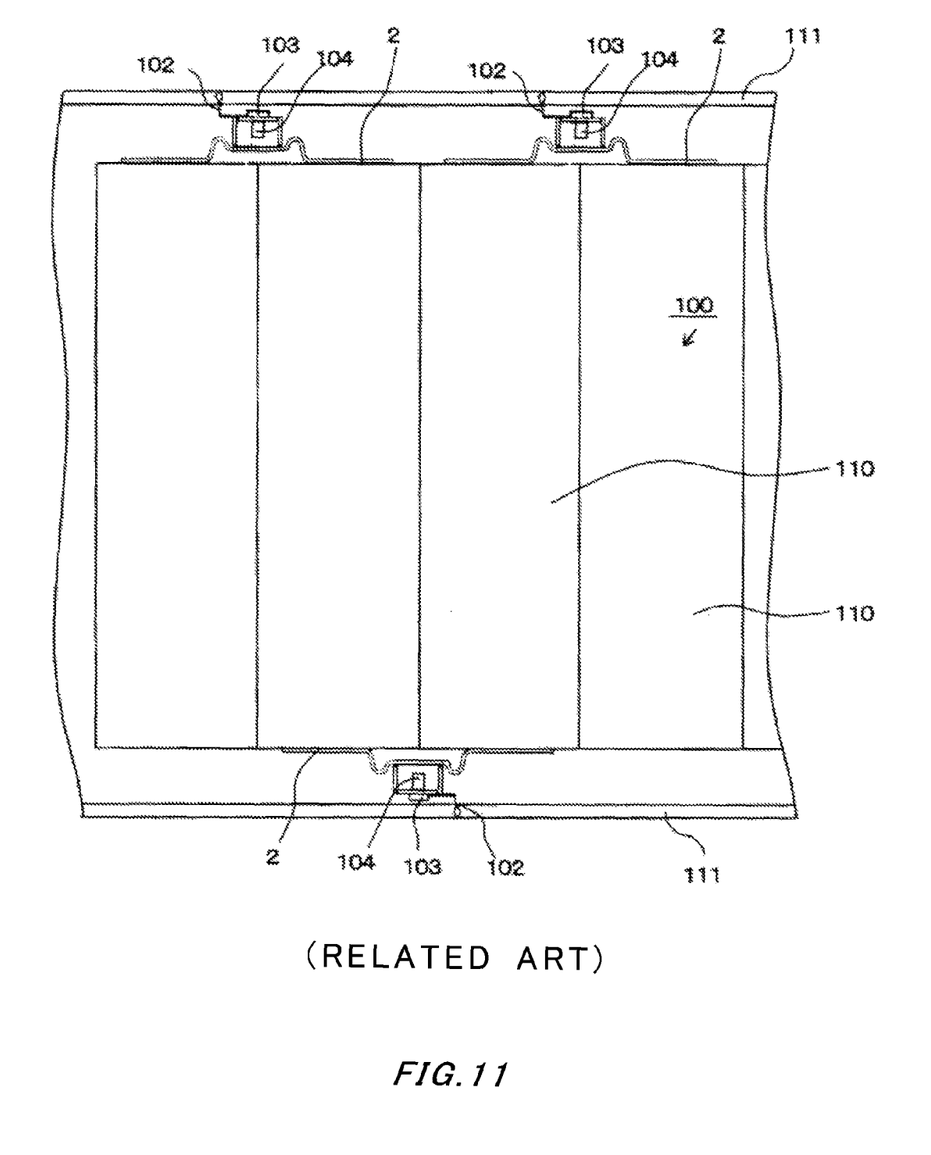
FIG. 11 is a front view showing a related connection structure 100 between metal plates.

To connect a large number of batteries (cells) 110 for on-vehicle use in parallel or in series, as shown in FIG. 11, the adjoining batteries 110 are electrically connected via bus bars 2 which are made of a metal plate and welded to the electrodes of the batteries 110 for connection. The bus bars 2 are thus connected to the electrodes of the respective batteries 110 and between the electrodes of the adjoining batteries 110. Charging voltages to the respective batteries 110 and the values of currents flowing between the batteries 110 can be obtained from the bus bars 2. Jumper plates 102 made of a metal plate are then electrically connected to the bus bars 2. Via the jumper plates 102, the bus bars 2 are electrically connected to sensors for monitoring the state of the voltages and currents of the batteries 110 and patterns of circuit boards 111 on which the sensors are mounted.

Since a high current flows through the bus bars 2, the connection of the bus bars 2 and the jumper plates 102 has a risk of heat generation if the electrical connection is made with a high contact resistance. Moreover, since the bus bars 2 and the jumper plates 102 are mounted on a vehicle and are likely to undergo vibrations over a long period, the bus bars 2 and the jumper plates 102 therefore need to be firmly fixed to each other at a high contact pressure. A connection structure 100 between a bus bar 2 and a jumper plate 102 is obtained as follows. Respective insertion holes having the same outline are formed in the bus bar 2 and the jumper plate 102. The bus bar 2 and the jumper plate 102 are stacked, and a bolt 103 or a screw is inserted through the coaxially-communicating through holes. Then, the bus bar 2 and the jumper plate 102 are fastened together between the bolt 103 or screw and a nut 104 so that the bus bar 2 and the jumper plate 102 are firmly fixed to each other and electrically connected at a high contact pressure (Patent Literature 1 and 2)

CITATION LIST

Patent Literature

Patent Literature 1: Japanese Patent Application Laid-Open No. 2011-208599
Patent Literature 1: Japanese Patent Application Laid-Open No. 2015-11844

SUMMARY

Technical Problem

The connection structure 100 between metal plates which fastens the bus bar 2 and the jumper plate 102 together by using the bolt 103 and the nut 104 needs parts for fastening the bolt 103 and the nut 104 for mutual connection. The additional process of screwing also increases the processing costs.

In particular, as shown in FIG. 11, the screwing operation using the bolt 103 and the nut 104 can be difficult to perform in a narrow gap between the batteries 110 and the circuit boards 111 arranged nearby. Moreover, if the metal plates 2 and 102 mounted on a vehicle are connected by the fastening of the bolt 103 and the nut 104, vibrations over a long period can loosen the fastening. There is a risk of disconnection of the electrical connection between the metal plates 2 and 102 or, if not disconnection, heat generation due to an increase in the contact resistance.

The insertion holes of the bus bar 2 and the jumper plate 102 are made to communicate coaxially, through which the bolt or screw is inserted. If the bus bar 2 and the jumper plate 102 have a difference in position, the bolt or screw cannot be inserted through the insertion holes to fasten the bus bar 2 and the jumper plate 102 together.

The bus bar 2, one of the metal plates, is connected to the electrodes of batteries 110 by welding. The surface of the bus bar 2 is therefore not plated, and an oxide film is likely to be formed on the surface that makes contact with the jumper plate 102. This increases the contact resistance and degrades connection reliability. In particular, the bus bar 2 and the jumper plate 102 left in a high-temperature high-humidity environment for on-vehicle use are likely to produce an oxide film on the contact surface and likely to have increased contact resistance.

Unlike the foregoing, the metal plate not to be welded in part is usually covered with a conductive plating coating so that the contact portion will not be covered with an oxide film and the connection reliability may improve. The metal plate of which the contact portion is covered with a plating coating cannot be connected with the other metal plate by a press contact connection structure that breaks the plating coating. An elastically deformable spring piece is then formed on either one of the metal plates. The contact portions are brought into elastic contact by elastic force of the spring piece to establish electrical connection with low contact resistance. Suppose that the connection structure using only the elastic deformation of either one of the metal plates to make contact with the other metal plate is employed for the connection between the metal plates for on-vehicle use. In such a case, large vibrations from the vehicle can easily cause an instantaneous disconnection because of low contact pressure. Moreover, the contact portion can wear away from continual vibrations over a long period, in which case the underlayer of the plating coating or the metal plate may be exposed and the contact portion may be covered with an oxide film.

The present invention has been achieved in view of the foregoing problems. An object of the present invention is to provide a connection structure between metal plates for mutually positioning and electrically connecting two metal plates by a simple press-in process without using an additional connection part.

Another object of the present invention is to provide a connection structure between metal plates for firmly connecting two metal plates so that the connection will not be disengaged under vibrations even if the two metal plates have a difference in position.

Still another object of the present invention is to provide a connection structure between metal plates in which contact surfaces where two metal plates make contact are kept out of touch with outside air and prevented from being covered with an oxide film, so that high contact reliability is obtained over a long period.

Solution to Problem

To achieve the foregoing objects, a connection structure between metal plates according to a first aspect of the present invention is a connection structure between metal plates, including: a first metal plate having an insertion hole formed therein, the insertion hole having an inner surface at least part of which being formed as a cylindrical inner wall surface curving along an arc; and a second metal plate having a contact portion which is inserted into the insertion hole, so as to relatively position the first metal plate and the second metal plate and put the contact portion into contact with the cylindrical inner wall surface to electrically connect the first metal plate and the second metal plate. In the connection structure, the connection portion is made of a curved blade plate curving with a curvature smaller than that of the cylindrical inner wall surface in the same direction as that of the cylindrical inner wall surface, and the curved blade plate is pressed into the insertion hole while being elastically deformed in the curving direction so that edges along both side edges of a curving outer peripheral surface thereof each make press contact with the cylindrical inner wall surface.

Since the pair of edges of the curved blade plate each make press contact with the cylindrical inner wall surface, the edges bite into the cylindrical inner wall surface to establish contact therebetween at a high contact pressure. Even if there is an oxide film on the contact surfaces, the edges break through the oxide film. After the press contact, the edges bite into the cylindrical inner wall surface so that the contact surfaces are kept out of touch with the outside air to preclude the formation of an oxide film. This provides high contact reliability.

The elastically-deformed curved blade plate biases the edges toward the press contact positions against the cylindrical inner wall surface. This establishes contact at a high contact pressure, and the first metal plate and the second metal plate are electrically connected with a low contact resistance.

Moreover, since the elastically-deformed curved blade plate biases the edges toward the press contact positions on the cylindrical inner wall surface, the press contact positions will not move even under vibrations. The first metal plate and the second metal plate are thus firmly positioned to each other.

Even if the first metal plate and the second metal plate have a difference in position about a center axis of the cylindrical inner wall surface, the distance between the press contact positions of the cylindrical inner wall surface where the pair of edges make press contact do not change. The first metal plate and the second metal plate are thus relatively positioned and electrically connected to each other.

The connection structure between metal plates according to a second aspect of the present invention is characterized in that at least part of a pair of edges along both side edges of the outer peripheral surface are formed in a tapered shape so that the outer peripheral surface is tapered from a base end side to a top end side in an insertion direction in which the curved blade plate is inserted into the insertion hole.

The angle at which the pair of edges formed in the tapered shape intersect can be changed to adjust insertion force by which the curved blade plate is inserted into the insertion hole and a contact area between the edges and the cylindrical inner wall surface.

Since the pair of edges are formed in the tapered shape, the press-in depth into the insertion hole can be adjusted to change the press contact positions of the cylindrical inner wall surface where the pair of edges make press contact. A difference in position between the first metal plate and the second metal plate can thus be absorbed.

The connection structure between metal plates according to a third aspect of the present invention is characterized in that the curved blade plate is formed by stamping out a metal plate of flat shape in a thickness direction, and the edges are formed at borders between both side end surfaces and the outer peripheral surface, the side end surfaces being cutout sections formed by stamping.

Since the cutout sections stamped out by pressing are not oxidized, there is no oxide film on the contact surfaces against the cylindrical inner wall surface.

The cutoff sections formed by stamping out a metal plate in the thickness direction and the outer peripheral surface intersect generally at right angles, with no curved surface at the edges serving as the borders. The edges can thus easily break through the cylindrical inner wall surface and an oxide film formed on the surface thereof for reliable press contact.

The connection structure between metal plates according to a fourth aspect of the present invention is characterized in that the second metal plate includes a stopper piece that comes into contact with a periphery of the insertion hole of the first metal plate when the curved blade plate is inserted into the insertion hole up to the base end.

The stopper piece makes contact with the first metal plate in a state where the base ends of the edges are in press contact with the cylindrical inner wall surface.

Even if the curved blade plate is subjected to unexpected external force or vibrations, the curved blade plate will not fall into the insertion hole.

The connection structure between metal plates according to a fifth aspect of the present invention is characterized in that recess grooves for the first metal plate around the insertion hole to fit in are formed in the side end surfaces of the curved blade plate near the base end.

The pair of edges are formed in the tapered shape so that the curved blade plate is tapered from the base end to the top end. If the curved blade plate is pressed into the insertion hole until the cylindrical inner wall surface reaches the recess grooves, the first metal plate around the insertion hole gets into and fits in the recess grooves, and the edges at the edges of the recess grooves make press contact with the cylindrical inner wall surface.

The connection structure between metal plates according to a sixth aspect of the present invention is characterized in that the first metal plate is a bus bar to be connected to an electrode of an on-vehicle battery by welding, and the second metal plate is a jumper plate that electrically connects the bus bar and a pattern of a circuit board and outputs charging information about the battery to the pattern of the circuit board.

Even if the cylindrical inner wall surface is covered with an oxide film, the edges of the curved blade plate break through the oxide film and the surface of the cylindrical inner wall surface and make press contact with the bus bar. As a result, the bus bar and the jumper plate are reliably electrically connected.

The edges in press contact with the cylindrical inner wall surface are biased toward the press contact positions by elastic deformation of the curved blade plate. The press contact positions are thereby maintained unchanged, and the bus bar and the jumper plate are reliably positioned to each other.

Since the edges and the cylindrical inner wall surface are not only in press contact connection but also make contact at a high contact pressure, the bus bar and the jumper plate are in contact with each other with a low contact resistance.

The connection structure between metal plates according to a seventh aspect of the present invention is characterized in that the insertion hole is an insertion hole having a circular outline through which for a screw for fastening the bus bar and the jumper plate together to be inserted.

The edges of the curved blade plate can be brought into press contact with the cylindrical inner wall surface of the screw-insertable insertion hole to electrically connect the bus bar and the jumper plate without changing the structure of the bus bar that can be fastened with the jumper plate by screwing.

Since the insertion hole has a circular outline, the pair of edges reliably make press contact with the cylindrical inner wall surface in whatever direction about the center of the circular shape the curved blade plate is pressed into the insertion hole.

According to the first aspect of the invention, the curved blade plate can make contact with the cylindrical inner wall surface at a high contact pressure by press contact connection and by its own elasticity, to establish electrical connection with a low contact resistance.

The edges of the curved blade plate bite into the cylindrical inner wall surface for press contact connection. The contact surfaces at the press contact positions are out of touch with the outside air, and no oxide film is formed thereon. This maintains a contact state of excellent durability.

The curved blade plate warps in the curving direction and elastically deforms to bias the edges toward the press contact positions against the cylindrical inner wall surface. Even if the curved blade plate is subjected to vibrations over a long period, the press contact positions therefore will not move, and the first metal plate and the second metal plate are positioned to each other.

Even if the first metal plate and the second metal plate have a difference in position about the center axis of the cylindrical inner wall surface, the first metal plate and the second metal plate are relatively positioned and electrically connected to each other.

According to the second aspect of the present invention, the angle at which the pair of edges formed in the tapered shape intersect can be changed to adjust the insertion force of the curved blade plate into the insertion hole and the contact area between the edges and the cylindrical inner wall surface.

The distance from the center axis of the cylindrical inner wall surface to the curved blade plate varies according to the press-in depth of the curved blade plate into the insertion hole. A difference in position between the first metal plate and the second metal plate can thus be absorbed by adjusting the rotation position of the curved blade plate about the center axis and the insertion depth into the insertion hole.

According to the third aspect of the present invention, no oxide film is formed on either of the side end surfaces making contact with the cylindrical inner wall surface near the edges. The first and second metal plates therefore make reliable contact with a low contact resistance.

Since the edges have no curved surface, the edges can be brought into press contact with the cylindrical inner wall surface by small operation force.

According to the fourth aspect of the present invention, excessive press-in of the curved blade plate into the insertion hole can be prevented.

The curved blade plate can also be prevented from accidentally falling into the insertion hole.

According to the fifth aspect of the present invention, the completion of the press-in process for pressing the curved blade plate into the insertion hole and bringing the edges into press contact with the cylindrical inner wall surface can be found out from vibrations when the first metal plate around the insertion hole comes into and fits in the recess grooves.

The first metal plate around the insertion hole gets into and fits in the recess grooves, and the first metal plate and the curved blade plate of the second metal plate are relatively positioned in the insertion direction into the insertion hole. The curved blade plate will not come off the insertion hole even under accidental external force or vibrations.

According to the sixth aspect of the present invention, even if part of the bus bar is welded and the cylindrical inner wall surface is covered with an oxide film in a high-temperature high-humidity environment in a vehicle, the edges of the curved blade plate break through the oxide film and the surface of the cylindrical inner wall surface to make press contact with the bus bar. As a result, the bus bar and the jumper plate are reliably electrically connected.

The edges of the curved blade plate are in press contact with the cylindrical inner wall surface and biased toward the press contact positions by the elastic deformation of the curved blade plate. The edges therefore make contact with the cylindrical inner wall at a high contact pressure. The press contact positions therefore will not move even if subjected to vehicle vibrations over a long period. The bus bar and the jumper plate are reliably relatively positioned for a long period.

Since the edges and the cylindrical inner wall surface are not only in press contact connection but also make contact at a high contact pressure, the bus bar and the jumper plate are electrically connected with a low contact resistance. This eliminates the risk of heat generation even if a high current flows through the bus bar.

According to the seventh aspect of the present invention, the bus bar has the same structure as that of a screwing system. A bus bar serving as a screwing part can thus be used.

Even if the bus bar and the jumper plate have a difference in position about the center of the circular insertion hole, the pair of edges of the curved blade plate reliably make press contact with the cylindrical inner wall of the insertion hole regardless of the direction of the difference in position.

DESCRIPTION OF EMBODIMENTS

A connection structure 1 between metal plates according to an embodiment of the present invention is a connection structure intended to connect electrodes of on-vehicle batteries (cells) 110 shown in FIG. 11 to a pattern of a circuit board 111 on which monitoring circuits for monitoring a voltage and a current are mounted. The connection structure 1 connects a bus bar 2 and a jumper plate 5 used between the electrodes and the pattern of the circuit board 111. More specifically, the bus bar 2 is connected to the electrodes of the batteries (cells) 110 by welding. The jumper plate 5 is connected to the pattern of the circuit board 111 by soldering. The connection structure 1 relatively positions, fixes, and electrically connects the bus bar 2 and the jumper plate 5 to each other. As will be described below, the bus bar 2 used in the connection structure 100 is simply used as the bus bar 2 according to the present embodiment without a change in shape. The bus bar 2 in the present embodiment is thus designated by the same reference numeral as shown in FIG. 11.

Figure 10:
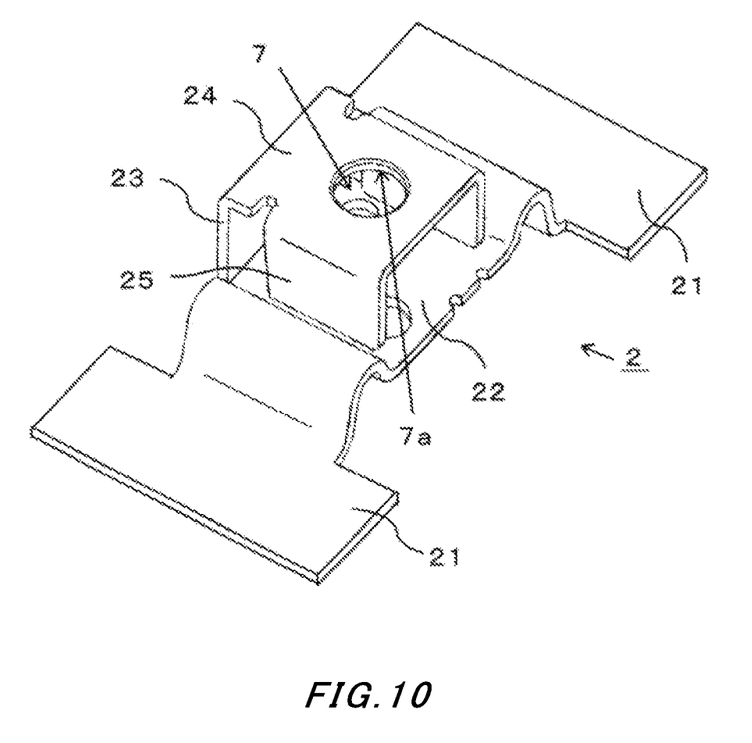
FIG. 10 is a perspective view of a bus bar 2.

The bus bar 2, one of the metal plates, is a 0.8-mm-thick conductive metal plate of phosphor bronze or the like, worked into the shape shown in FIG. 10 by press molding. The bus bar 2 integrally includes welding connection portions 21 of rectangular shape, a base portion 22 of rectangular shape, a back plate portion 23, a connection plate portion 24, and side plates 25. The welding connection portions 21 are connected to the electrodes of respective adjoining batteries 110 by welding. The base portion 22 is arranged between the welding connection portions 21. The back plate portion 23 is erected on the back side of the base portion 22. The connection plate portion 24 is horizontally supported by the back plate portion 23 in parallel with the base portion 22. The side plates 25 are perpendicularly arranged on both sides of the connection plate portion 24 and maintain the connection plate portion 24 horizontal. A 4.6-mm-diameter circular insertion hole 7 is formed in the center of the connection plate portion 24. The insertion hole 7 is intended for a bolt 103 to be inserted through to fasten the bus bar 2 and a jumper plate 102 together (see FIG. 11). In the present embodiment, this insertion hole 7 is utilized to connect the jumper plate 5. The bus bar 2 used in the connection structure 100 with the bolt 103 is thus used.

The jumper plate 5, the other metal plate, is also formed by pressing of a metal plate of phosphorous bronze which has excellent conductivity and elasticity. As shown in FIGS. 6 to 9, the jumper plate 5 includes a solder connection piece 53, a curved blade plate 3, and a pair of stopper pieces 4. The solder connection piece 53 is inserted into a through hole of the circuit board 111 (see FIG. 11) and soldered to the pattern of the circuit board 111. The curved blade plate 3 lies on the other side of a connection plate 51 from the solder connection piece 53, and serves as a connection portion that is inserted through the insertion hole 7 of the bus bar 2 and makes contact with the bus bar 2. The pair of stopper pieces 4 are horizontally protruded above the base end side of the curved blade plate 3.

Figure 3:
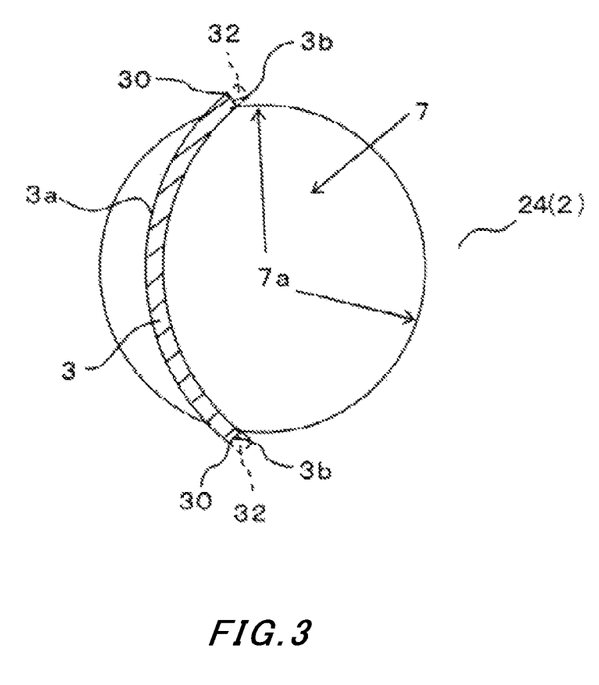
FIG. 3 is an enlarged view of essential parts of FIG. 2.

The entire curved blade plate 3 is formed to curve along an arc having a curvature gentler than that of the circular shape of the insertion hole 7 in the bus bar 2 (see FIG. 3). The curved blade plate 3 is formed in a tapered shape so that the horizontal width in the curving direction is the largest in a base end portion 31 on the base end side (upper side in FIG. 7) and decreases gradually from the base end portion 31 to a top end side in an insertion direction in which the curved blade plate 3 is inserted into the insertion hole 7 (vertical direction in FIG. 7).

The curved blade plate 3 is pressed into the insertion hole 7 of the bus bar 2 in a state of being curved along the arc. Borders where a curved outer peripheral surface 3a on the outside and both left and right side end surfaces 3b, formed as cutout sections by stamping out the metal plate, intersect at right angles constitute edges 30 to be brought into press contact with the cylindrical inner surface 7a of the insertion hole 7. The pair of edges 30 also form a tapered shape of being tapered toward the top end side. The distance between the edges 30 on both sides of the base end portion 31 where the horizontal width is the largest is configured to be longer than at least the diameter of the insertion hole 7. The purpose is so that the edges 30 reliably make press contact with the cylindrical inner surface 7a while the curved blade plate 3 is further warped in the curving direction.

An intersection angle α between the pair of edges 30 of the tapered shape below the base end portion 31 can be appropriately adjusted to adjust a pressing operation force by which the curved blade plate 3 is pressed into the insertion hole 7 and a contact area with the cylindrical inner surface 7a. More specifically, the intersection angle α can be reduced to reduce the pressing operation force by which the curved blade plate 3 is pressed into the insertion hole 7. This also increases the contact area with the cylindrical inner surface 7a. However, the length of the curved blade plate 3 in the insertion direction increases to increase the size of the entire connection structure 1. On the other hand, if the intersection angle α is increased to reduce the height of the curved blade plate 3, the pressing operation force by which the curved blade plate 3 is pressed into the insertion hole 7 increases. Besides, the curved blade plate 3 pressed in is more likely to come off the insertion hole 7 unless retaining measures are taken.

The present embodiment uses an existing bus bar 2 in which the height of the insertion hole 7 above the base portion 22 and the diameter of the insertion holes 7 have prescribed values. The intersection angle α between the pair of edges 30 is thus arbitrarily set within the range of greater than or equal to a certain angle at which the top end of the curved blade plate 3 pressed in the insertion hole 7 does not make contact with the base portion 22, and smaller than or equal to 45° where the pressing operation force for press-in is not high.

Figure 7:
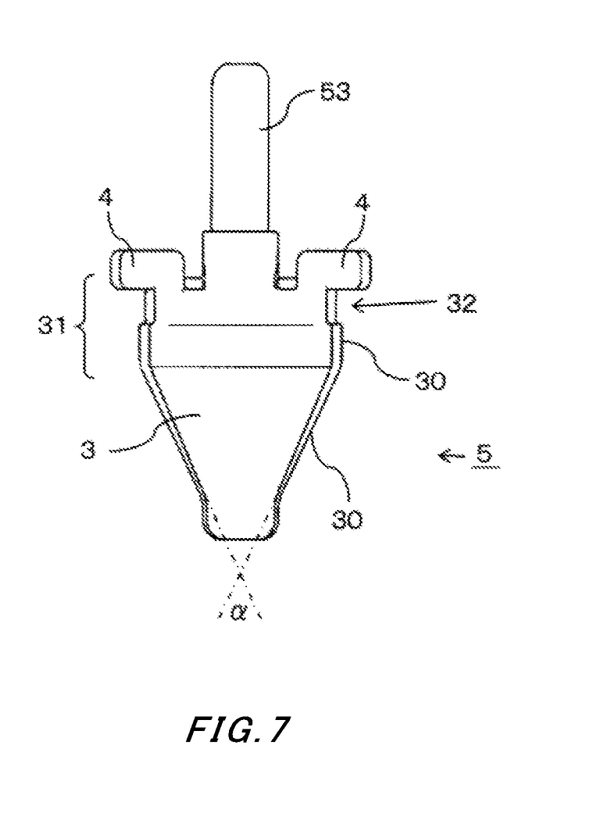
FIG. 7 is a side view of the jumper plate 5.
Figure 8:
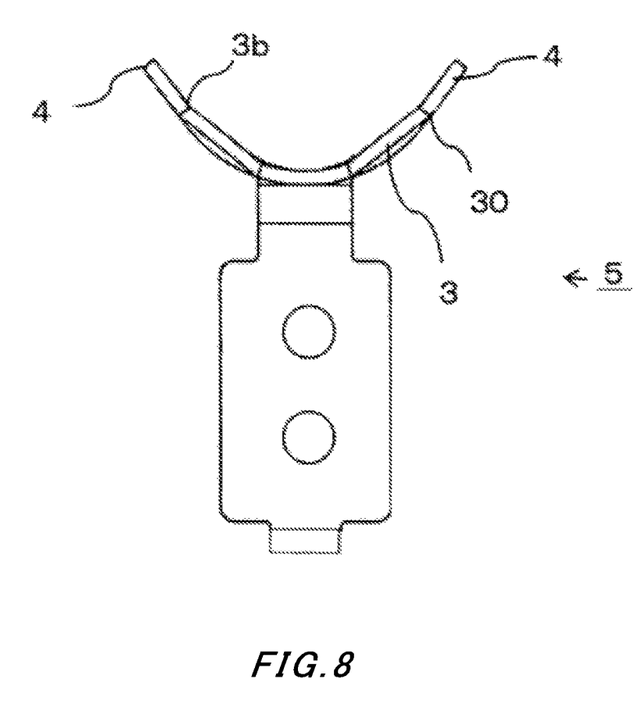
FIG. 8 is a bottom view of the jumper plate 5.
Figure 9:
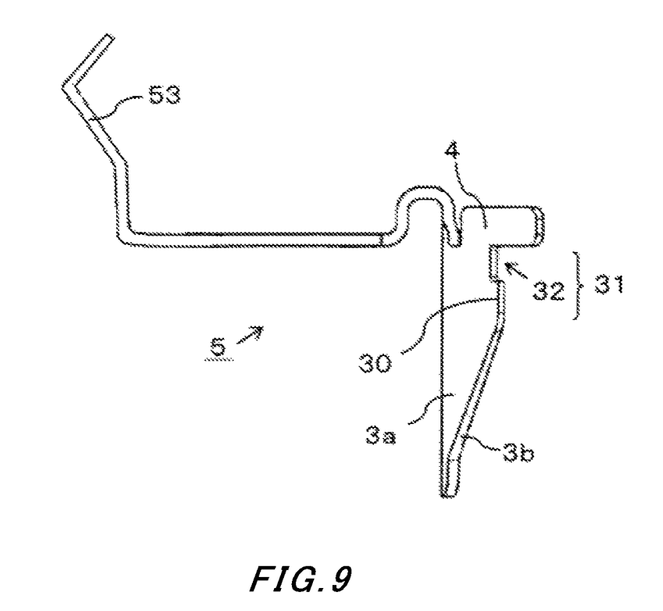
FIG. 9 is a front view of the jumper plate 5.

As shown in FIG. 7, the distance between the edges 33 on both sides of the base end portion 31 is constant. Recess grooves 32 are formed in both left and right side end surfaces 3b of the base end portion 31 closer to the base end (closer to the top). The width of the recess grooves 32 in the insertion direction is slightly larger than 0.8 mm which is the thickness of the connection plate portion 24 around the insertion hole 7. Consequently, if the curved blade plate 3 is pressed into the insertion hole 7 and the cylindrical inner surface 7a of the insertion hole 7 reaches the recess grooves 32, the connection plate portion 24 around the insertion hole 7 falls into and fits in the recess grooves 32. The curved blade plate 3 is thereby prevented from coming off the insertion hole 7 upward. The edges 30 are also formed at the borders between the side end surfaces 3b, or the inner bottom surfaces of the recess grooves 32, and the outer peripheral surface 3a. Even after the fitting into the recess grooves 32, the edges 30 therefore make press contact with the cylindrical inner surface 7a.

The pair of stopper pieces 4 define the upper ends of the recess grooves 32 with the same curvature as that of the curved blade plate 3, and are continuously horizontally protruded above the recess grooves 32. If the curved blade plate 3 is attempted to be further pressed into the insertion hole after the connection plate portion 24 around the insertion hole 7 is fitted to the recess grooves 32, the flat surface (top surface) of the connection plate portion 24 comes into contact with the bottoms of the stopper pieces 4. This prevents excessive press-in and falling of the curved blade plate 3 into the insertion hole 7.

A connection process for connecting the jumper plate 5 with the bus bar 2 configured as described above will be described below. Suppose that the welding connection portions 21 on both sides of the bus bar 2 are welded to the electrodes of adjoining on-vehicle batteries 110 and thereby connected to the batteries 110; that the solder connection piece 53 of the jumper plate 5 is soldered to the pattern of the circuit board 111; and that the bus bar 2 and the jumper plate 5 are thereby fixed to the battery side and the circuit board 111 side, respectively. Such connections are omitted in the diagrams.

Figure 4:
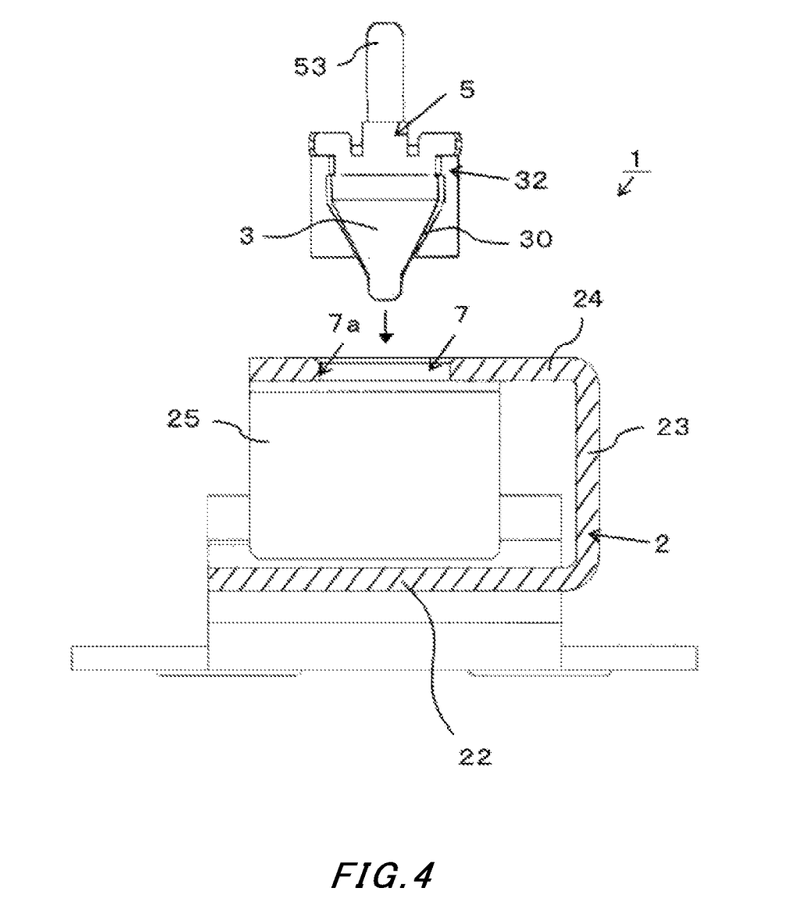
FIG. 4 is a partially longitudinal sectional side view showing a process for pressing the curved blade plate 3 into the insertion hole 7.
Figure 5:
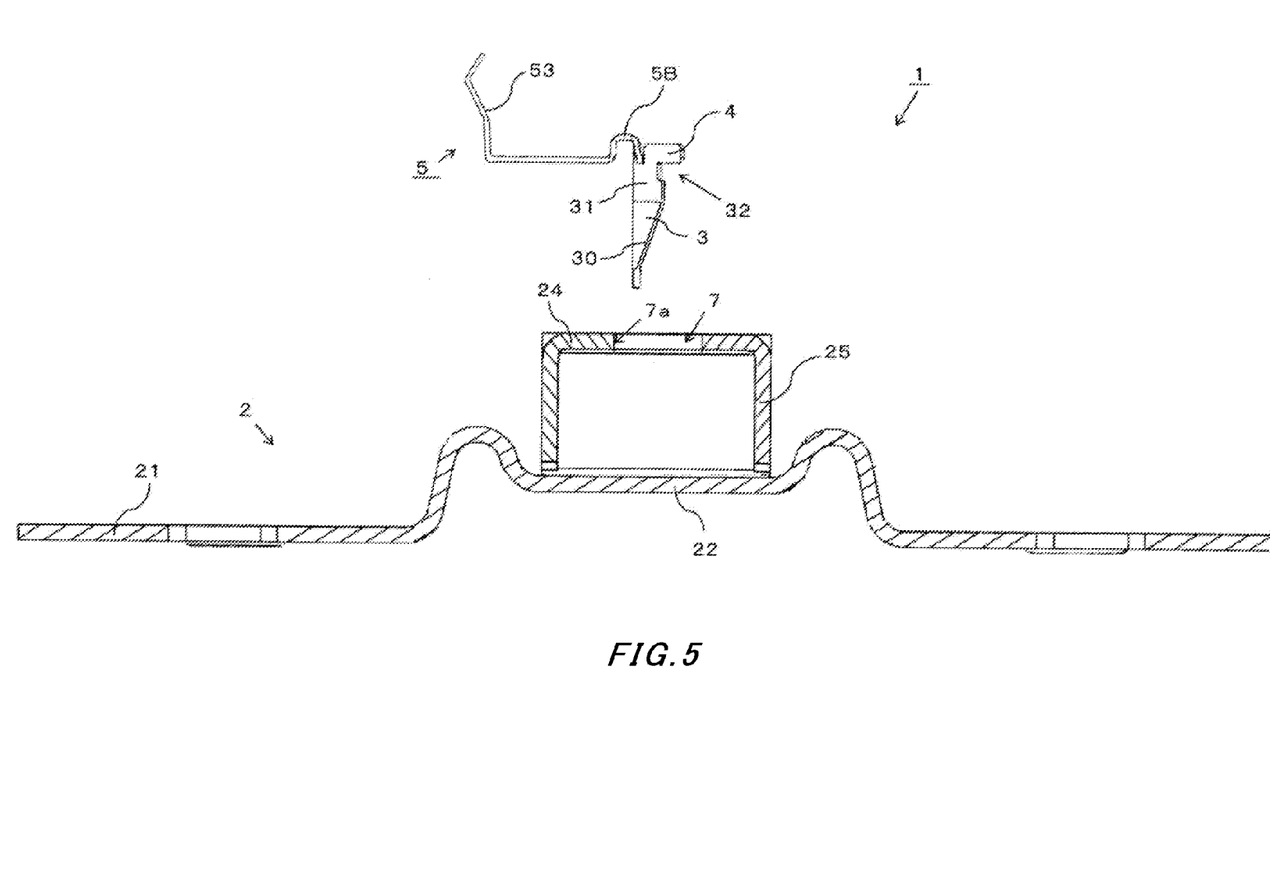
FIG. 5 is a partially longitudinal sectional front view showing the process for pressing the curved blade plate 3 into the insertion hole 7.
Figure 6:
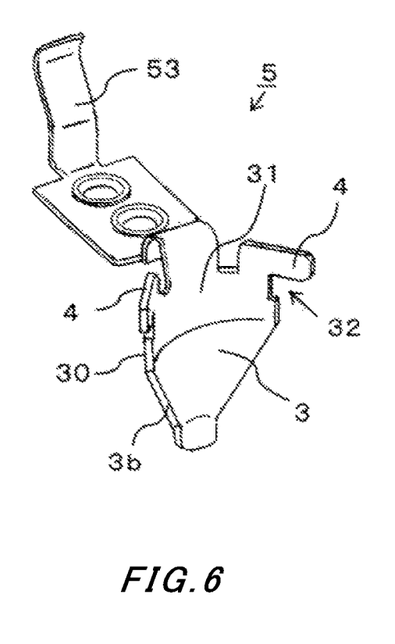
FIG. 6 is a perspective view of a jumper plate 5.

As shown in FIGS. 4 and 5, the bus bar 2 and the jumper plate 5 are connected by inserting the curved blade plate 3 of the jumper plate 5 into the circular insertion hole 7 of the bus bar 2 from above. The edges 30 on both sides of the curved blade plate 3 are formed along the respective left and light side end surfaces 3b of tapered shape. At the beginning of insertion into the insertion hole 7, the edges 30 therefore make no contact with the cylindrical inner surface 7.

If the curved blade plate 3 is inserted up to a certain depth, the edges 30 come into contact with the cylindrical inner surface 7. The contact pressure is not so high for the edges 30 to bite into the cylindrical inner surface 7. As the curved blade plate 3 is further inserted and the distance between the edges 30 increases, the contact positions of the edges 30 move in a direction of increasing the distance between the contact positions. The upper limit of the distance between the contact positions of the edges 30 is the diameter of the insertion hole 7. With the insertion of the curved blade plate 3, before a straight line connecting the contact positions passes the center of the insertion hole 7, the contact pressure increases and the edges 30 bite into the cylindrical inner surface 7a. The edges 30 start making press contact with the cylindrical inner surface 7.

After the press contact, if the curved blade plate 3 is further pressed in downward, the contact positions (press contact positions) of the edges 30 do not change and only the horizontal width between the tapered edges 30 increases. The curved blade plate 3 then warps further in the curving direction under reaction force from the press contact positions. In the press contact positions where the edges 30 bite into the cylindrical inner surface 7a, the edges 30 bite into the cylindrical inner surface 7a with a large press contact force resulting from the contact pressure due to the increase in the horizontal width between the edges 30 plus an elastic force from the warping curved blade plate 3.

Figure 1:
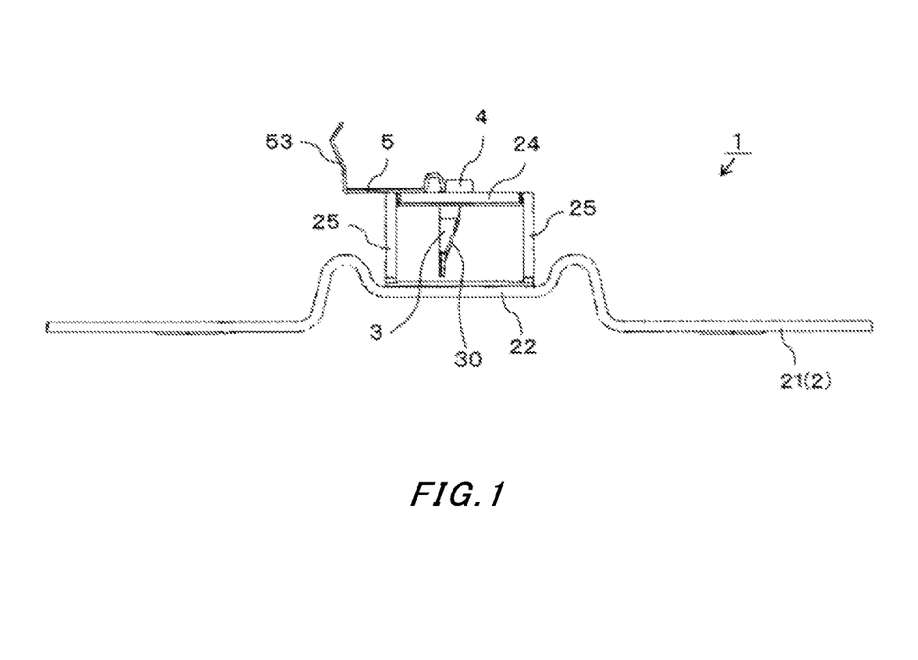
FIG. 1 is a front view of a connection structure 1 between metal plates according to an embodiment of the present invention.
Figure 2:
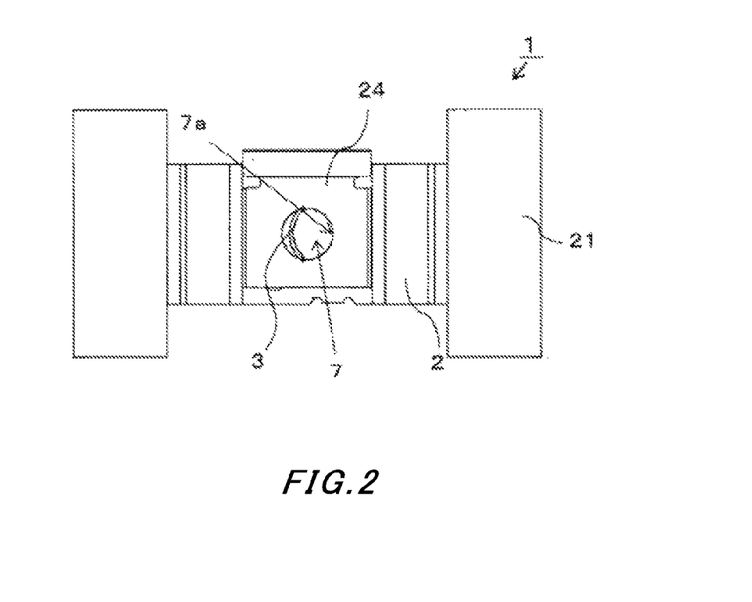
FIG. 2 is a cross-sectional view showing a curved blade plate 3 pressed in an insertion hole 7 for connection, as sectioned along the surface of the insertion hole 7.

If the press contact positions reach the base end portion 31 of the curved blade plate 3, the press-in of the curved blade plate 3 causes no change in the press contact force because the horizontal width between the edges 30 is constant. If the curved blade plate 3 is further pressed in, as shown in FIGS. 2 and 3, the contact plate portion 24 around the insertion hole 7 falls into and fits in the recess grooves 32. The curved blade plate 3 is thereby prevented from coming off the insertion hole 7 upward.

If the curved blade plate 3 is attempted to be pressed in downward even after the fitting of the connection plate portion 24 to the recess grooves 32, the stopper pieces 4 come into contact with the flat surface of the contact plate portion 24, whereby further press-in downward is regulated. In other words, the connection process of the bus bar 2 and the jumper plate 5 is completed with the connection plate portion 24 fitted to the recess grooves 32. The operator who performs the press-in operation can find out the completion of the connection process from vibrations when the connection plate portion 24 falls into the recess grooves 32.

As shown in FIG. 3, even in the connection state of the bus bar 2 and the jumper plate 5 where the contact plate portion 24 is fitted to the recess grooves 32, the edges 30 are formed at the borders between the side end surfaces 3b, or the inner bottom surfaces of the recess grooves 32, and the outer peripheral surface 3a as described above. Receiving the reaction force from the side end surfaces 3b on both sides, the curved blade plate 3 warps with a curvature greater than that of the initial curved shape. A high press contact force including the elastic force of the curved blade plate 3 thus acts on the press contact positions of the edges 30. Consequently, even if the curved blade plate 3 is subjected to unexpected external force or vibrations, the edges 30 will not come off the press contact positions of the cylindrical inner surface 7a, and the bus bar 2 and the jumper plate 5 are firmly fixed to each other.

Since the bus bar 2 is welded in the welding connection portions 21, no plating coating for improving contact reliability can be formed on the cylindrical inner surface 7a where the curved blade plate 3 makes contact. However, the edges 30 and the side end surfaces 3b bite into the cylindrical inner surface 7a with a high press contact force and make direct contact with the material of the bus bar 2. This precludes the formation of an oxide film therebetween, and the bus bar 2 and the jumper plate 5 are electrically connected to each other with a low contact resistance and high contact reliability.

Before the connection process of the curved blade plate 3, an oxide film may be formed on the surface of the curved blade plate 3 and/or the cylindrical inner surface 7a. Even in such a case, the edges 30 break through the oxide film with the high press contact force, and similarly establish electrical connection with high connection reliability.

The foregoing press contact action of the curved blade plate 3 on the cylindrical inner surface 7a of the insertion hole 7 does not depend on the direction of the curved blade plate 3 about the center axis of the insertion hole 7. In other words, even if the curved blade plate 3 is shifted in position about the center axis of the insertion hole 7, the curved blade plate 3 can be brought into press contact with the cylindrical inner surface 7a regardless of the shift in position.

The foregoing embodiment has been described by using an example where the insertion hole 7 for the curved blade plate 3 to be pressed into has a circular outline. However, the present invention is applicable to insertion holes having other outlines as long as at least part of the inner surface is curved along an arc. Examples of such insertion holes may include a long hole having a semicircular outline at both sides, and one having an elliptical outline.

In the foregoing embodiment, both side edges of the curved blade plate 3 are tapered in part. Various shapes may be used as long as the edges at both side edges of the curved outer peripheral surface make press contact with the cylindrical inner surface.

The foregoing embodiment has dealt with the connection structure between two types of metal plates for connecting on-vehicle batteries and a circuit board. However, the intended use of the two types of metal plates is not limited. The present invention is applicable to any metal plates that are made of conductive material capable of press contact connection.

REFERENCE SIGNS LIST 1 connection structure between metal plates
2 bus bar (first metal plate)
3 curved blade plate (connection portion)
3a outer peripheral surface
3b side end surface
4 stopper piece
5 jumper plate (second metal plate)
7 insertion hole
7a cylindrical inner surface
30 edge
32 recess groove

The invention claimed is:

1. A connection structure between metal plates, comprising:
a first metal plate having an insertion hole formed therein, the insertion hole having an inner surface at least part of which being formed as a cylindrical inner wall surface curving along an arc; and
a second metal plate having a contact portion which is inserted into the insertion hole, so as to relatively position the first metal plate and the second metal plate and put the contact portion into contact with the cylindrical inner wall surface to electrically connect the first metal plate and the second metal plate, wherein:
the contact portion is made of a curved blade plate curving with a curvature smaller than that of the cylindrical inner wall surface in a same direction as that of the cylindrical inner wall surface; and
the curved blade plate is pressed into the insertion hole while being elastically deformed in a curving direction so that edges along both side edges of a single curving outer peripheral surface thereof each bite into the cylindrical inner wall surface and make press contact with the cylindrical inner wall surface, wherein a distance between the side edges of the single curving outer peripheral surface of the curved blade plate where a horizontal width between the side edges is the largest is longer than a diameter of the insertion hole.

2. The connection structure between metal plates according to claim 1, wherein at least part of a pair of edges along both side edges of the single curving outer peripheral surface are formed in a tapered shape so that the single curving outer peripheral surface is tapered from a base end side to a top end side in an insertion direction in which the curved blade plate is inserted into the insertion hole.

3. The connection structure between metal plates according to claim 2, wherein the curved blade plate is formed by stamping out a metal plate of flat shape in a thickness direction, and the edges are formed at borders between both side end surfaces and the single curving outer peripheral surface, the side end surfaces being cutout sections formed by stamping.

4. The connection structure between metal plates according to claim 2, wherein the second metal plate includes a stopper piece that comes into contact with a periphery of the insertion hole of the first metal plate when the curved blade plate is inserted into the insertion hole up to the base end.

5. The connection structure between metal plates according to claim 2, wherein recess grooves for the first metal plate around the insertion hole to fit in are formed in the side end surfaces of the curved blade plate near the base end.

6. The connection structure between metal plates according to claim 1, wherein the first metal plate is a bus bar to be connected to an electrode of an on-vehicle battery by welding, and the second metal plate is a jumper plate that electrically connects the bus bar and a pattern of a circuit board and outputs charging information about the battery to the pattern of the circuit board.

7. The connection structure between metal plates according to claim 6, wherein the insertion hole is an insertion hole having a circular outline through which a screw for fastening the bus bar and the jumper plate together is to be inserted.

8. The connection structure between metal plates according to claim 1, wherein the edges each bite into the cylindrical inner wall surface with a sufficient press contact force resulting from a contact pressure due to an increase in the horizontal width between the edges plus an elastic force from the curved blade plate warped.

9. The connection structure between metal plates according to claim 1, wherein the first metal plate is formed by a phosphor bronze.

10. The connection structure between metal plates according to claim 9, wherein the second metal plate is formed by a phosphor bronze.

11. The connection structure between metal plates according to claim 1, wherein the second metal plate is formed by a phosphor bronze.

* * * * *